INVENTORS
ROGER P. VAN DRIESEN
NORMAN C. STEWART
BY
ATTORNEY

United States Patent Office 3,410,792
Patented Nov. 12, 1968

3,410,792
METHOD FOR REMOVING PARTICULATE CATALYST FROM FLUID-CATALYST CONTACTING ZONE
Roger P. Van Driesen, Hopewell, and Norman C. Stewart, Kendall Park, N.J., assignors to Cities Service Research and Development Company, New York, N.Y., a corporation of Delaware
Filed Oct. 22, 1965, Ser. No. 501,213
15 Claims. (Cl. 208—143)

ABSTRACT OF THE DISCLOSURE

A process is disclosed for controlled withdrawal of particulate catalyst from a continually operating fluid-catalyst contacting zone having an expanded catalyst bed, particularly an ebullated bed hydrogenation zone. A conduit is provided for withdrawing liquid product from a point above the normal upper level of the catalyst bed. Catalyst is withdrawn by intermittently elevating the upper level of the catalyst bed, thereby increasing the concentration of catalyst in the liquid stream passing through the withdrawal conduit, until a desired amount of catalyst has been removed.

---

Figure 1:
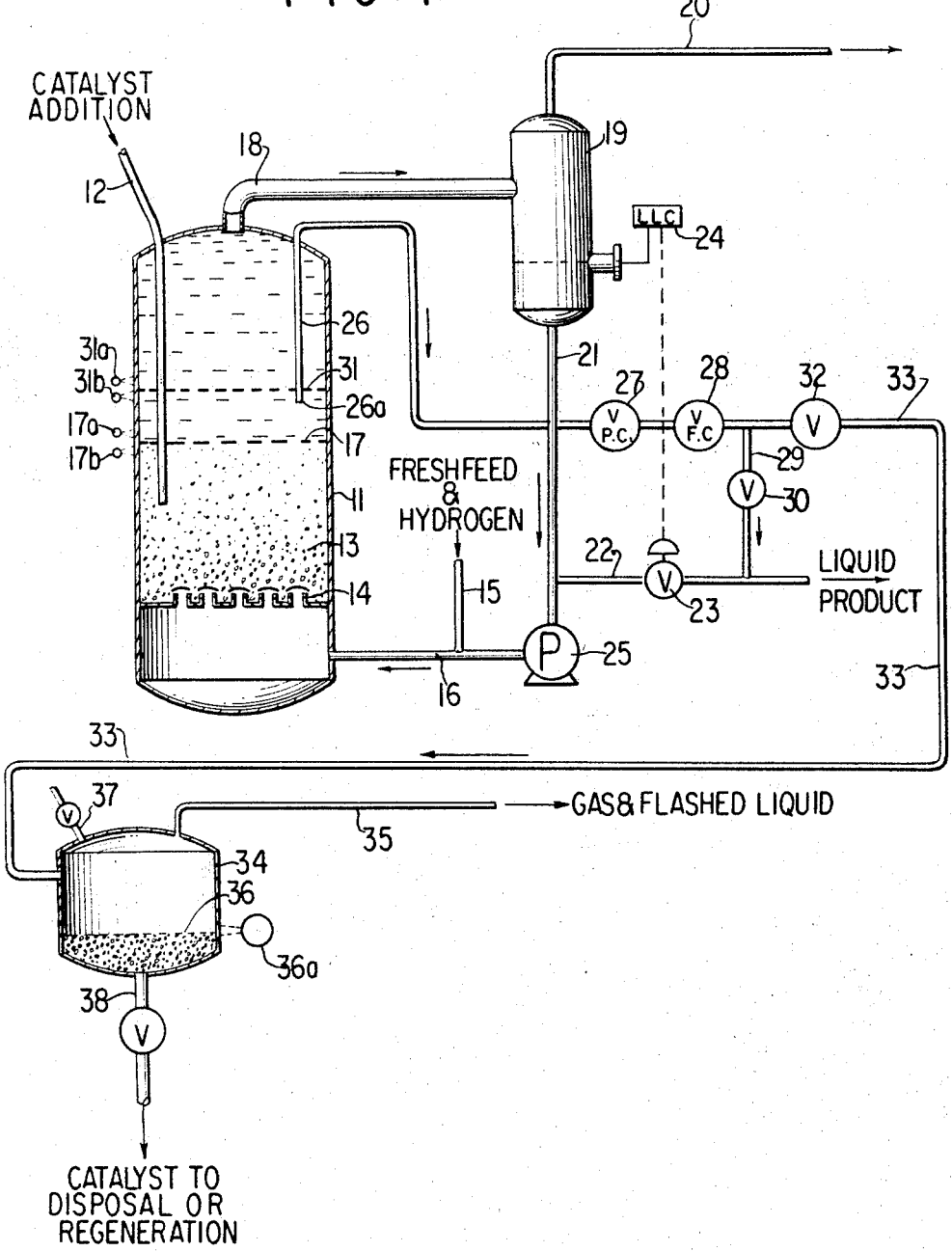

This invention provides an improved method for removing particulate catalyst from a fluid-catalyst contacting zone.

The invention has particular application to processes of the type wherein a fluid is passed upwardly through a catalyst bed at an upflow velocity such that the catalyst bed is maintained in an expanded state having a normal, substantially definite upper level. Processes of this type are exemplified by the hydrogenation of liquid hydrocarbon oils. Heretofore, it has been the general practice to remove spent, deactivated particulate catalyst from such liquid hydrocarbon hydrogenation zones intermittently by means of a valved conduit extending substantially vertically downwardly from the catalyst bed through the bottom of the hydrogenation vessel. The main drawback of this method has been the tendency of the catalyst withdrawal conduit to plug-up with coke formed by in situ cracking of hydrocarbon oil feed within the conduit, thereby preventing passage of catalyst therethrough. Purging the conduit when not in use with hydrogen to clear it of coke is not entirely practical since such practice would require a large amount of cool hydrogen and would, therefore, be economically undesirable, as well as undesirable from the standpoint that an excessive amount of hydrogen would be built-up at an unfavorable location within the hydrogenation zone. Furthermore, this type of catalyst withdrawal procedure requires careful attention on the part of the operator and excessive maintenance.

It is one object of the present invention to provide an improved method for withdrawing particulate catalyst from a fluid-catalyst contacting zone.

It is another object of this invention to provide a method for withdrawing catalyst from a liquid hydrocarbon oil hydrogenation zone whereby difficulties due to line plugging and hydrogen purging are not experienced.

It is another object of this invention to provide a method for removing catalyst from a fluid-catalyst contacting zone whereby the quantity of catalyst withdrawn may be accurately measured, thus enabling replacement with the correct amount of fresh catalyst.

Various other objects and advantages of the invention will become apparent from the following detailed description thereof.

Briefly, in accordance with the present invention, a liquid effluent stream having a "normal catalyst concentration" is withdrawn from the fluid-catalyst contacing zone at a point above the "normal upper level of the catalyst bed," i.e., the substantially well defined upper level of the catalyst bed established at normal operating conditions. The term "normal catalyst concentration" as used herein thus refers to the catalyst concentration in the withdrawn fluid effluent stream when the upper level of the catalyst bed is normally maintained. It will be understood that "normal catalyst concentration" is intended to include the situation wherein the effluent stream during normal operation is substantially free of catalyst.

The catalyst concentration in the effluent stream is intermittently increased by elevating the upper level of the catalyst bed. After a desired amount of catalyst is withdrawn from the contacting zone at the increased concentration in the fluid effluent stream, the normal upper level of the catalyst bed is re-established, and withdrawal of the effluent stream containing a normal catalyst concentration is thus resumed. Thus, the invention contemplates a continuous flow through the conduit in which catalyst is withdrawn from the contacting zone to maintain the conduit free from plugging. According to a preferred embodiment, the effluent stream during normal operation is substantially free of catalyst. Semi-continuous removal of catalyst in this manner enables accurate control over the quantity withdrawn.

Figure 2:
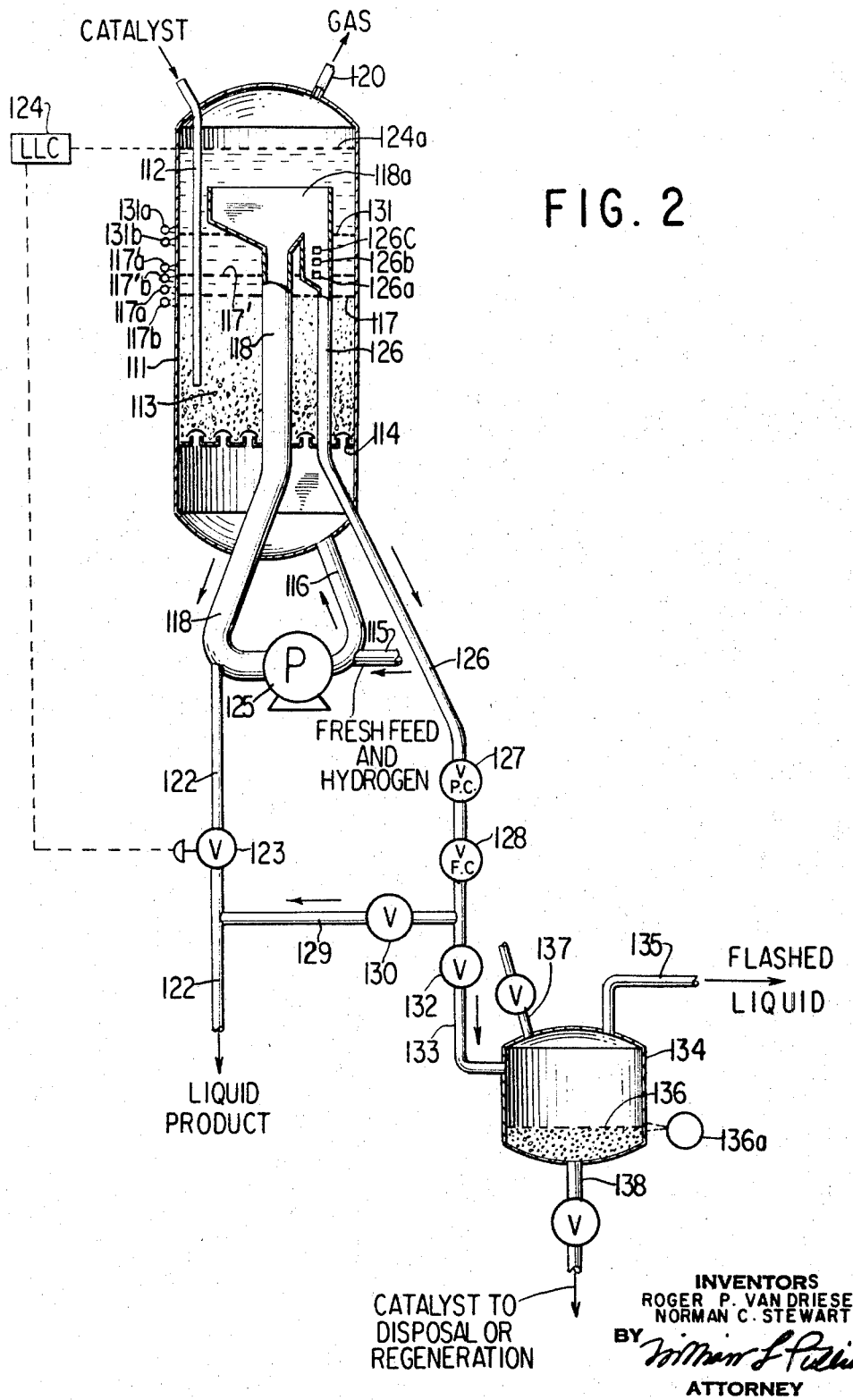

A more complete understanding of the invention may be had by referring to the accompanying drawings which illustrate certain preferred embodiments for removing deactivated catalyst from a hydrogenation zone and in which:

FIGURE 1 is a diagrammatic illustration in which equipment is shown in elevation of a suitable apparatus arrangement for carrying out a preferred embodiment of the invention in conjunction with a process for the hydrogenation of hydrocarbon oil, and FIGURE 2 diagrammatically depicts another suitable apparatus arrangement for conducting the invention in conjunction with a hydrogenation process.

Referring to FIGURE 1, the reactor represented by reference numeral 11 is generally a vessel capable of withstanding pressures on the order of 1,000 to 5,000 p.s.i.g. and temperatures on the order of 400° F. to 1500° F. normally associated with hydrogenation operations. The reactor is supplied with particulate catalyst through line 12, which extends downwardly into the reactor, to form a catalyst bed 13 supported on a conventional bubble cap tray 14 or other suitable means.

As is well-known in the art, suitable hydrogenation catalysts include, for instance, cobalt, iron, molybdenum, nickel, tungsten, cobalt-molybdenum, etc. Such catalysts, as well as their sulfides and oxides, may be used alone or together with suitable catalysts such as naturally occurring clays, etc., or in combination with each other. The catalyst may also be supported on a suitable base such as alumina, silica, or silica-alumina. Generally speaking, the diameters of the catalyst particles range from about $1/48$ inch to about $1/2$ inch and preferably are in the form of elongated extrudates.

A mixture of fresh hydrocarbon oil feed and hydrogen, which may be pure hydrogen or hydrogen-containing gas such as recycle gas containing hydrogen as well as normally gaseous hydrocarbons and possibly inert gases, e.g., nitrogen, is passed through conduit 15 and combined with recycle oil in conduit 16. The resultant mixture, preferably after being passed through a preheater, not shown, is charged to the lower portion of reactor 11. The mixture passes upwardly through the bubble cap tray 14 and is thereby uniformly distributed through the catalyst bed in the hydrogenation zone. The upflow velocity at which the oil-gas mixture is passed through the catalyst bed is such that the catalyst particles are maintained in a state of ebullation, the gross mass of the bed expanding at least 10%, and usually not greater than about 300% over the volume which it occupies in a settled state. Thus, during periods of normal operation, the ebullated catalyst bed assumes a substantially definite upper level as denoted by 17. The normal upper level of the bed may be detected by means of radionic level indicators 17a and 17b. Generally speaking, the upflow liquid velocity of the mixture is from about 5 to about 500 gallons per minute per square foot of horizontal cross-section of the ebullated mass, preferably from 20 to 120 gal./min./sq. ft. A more complete understanding of an ebullated bed hydrogenation process may be had by referring to U.S. Patents 2,987,465 and Re. 25,770 of Johanson.

The liquid and gaseous reactor effluent may be withdrawn together from the reactor by means of conduit 18 and passed to a gas-liquid separator 19. Hydrogen and like gases are removed overhead from separator 19 through conduit 20 and may, if desired, be recycled to the hydrogenation reactor 11, as previously noted. Liquid separated in separator 19 is removed therefrom through conduit 21, and at least a portion thereof recovered as hydrogenated product through conduit 22 provided with a valve 23. The operation of valve 23 may be controlled by means of level controller 24 which maintains a suitable level of liquid in separator unit 19. Another portion of the liquid recovered from separator 19 is preferably recycled to the reactor 11 through conduit 16 by means of pump 25. Recycle rates between about 5 and about 25 volumes of recycle liquid per volume of fresh feed are generally preferred.

During periods of normal operation, i.e., when the concentration of catalyst in the bed and the upflow velocity through the bed are such as to establish a substantially well-defined catalyst-liquid interface 17, a second effluent stream, substantially free of catalyst, is withdrawn from the reactor 11 through conduit 26 having an open end 26a located above the upper level of the catalyst bed.

As shown in the drawing, conduit 26 may be provided with pressure control and flow control valves 27 and 28 respectively. Preferably the flow of liquid effluent through conduit 26 is appreciably less than that through primary withdrawal conduit 18, e.g., from about 0.01 to about 0.25 than through conduit 18. The liquid effluent withdrawn through conduit 26 may be passed by conduit 29 provided with valve 30 and combined with the liquid product stream in conduit 2.

Catalyst withdrawal from bed 13 may be accomplished in accordance with the invention by elevating the upper level of the bed at least to opening 26a of conduit 26, but not as high as the point at which effluent is withdrawn through primary withdrawal conduit 18. For example, the upper level of the catalyst bed may be elevated to level 31, detected by radionic level indicators 31a and 31b, by increasing the upflow liquid velocity through catalyst bed 13, such as by suitably increasing the rate at which liquid is recycled to the reactor through conduit 16. The required increase in the upflow liquid velocity is, of course, dependent, inter alia, on the positioning of open end 26a of conduit 26 with respect to the normal bed level 17. Generally, conduit 26 is extended downwardly into the reactor a distance such that a 5 to 20 percent expansion of the normal volume of the ebullated catalyst bed will increase the bed level above end 26a. Typically, exapnded bed volumes on this order may be brought about by increasing the normal upflow liquid velocity from about 5 to about 25 percent.

With the catalyst bed level elevated to 31, catalyst is caused to flow in admixture with liquid through conduit 26. Valve 30 in conduit 29 is closed and valve 32 is opened thereby directing the flow through conduit 33 which leads to a catalyst withdrawal pot 34. Gas and liquid are flashed from withdrawal pot 34 through conduit 35, and may be passed to a suitable recovery unit, not shown. Catalyst withdrawal is continued in this manner until the catalyst accumulation in pot 34 builds up to a pre-established level 36.

When the desired catalyst level 36 is indicated in the withdrawal pot by means of level indicator 36a, the normal upper level 17 of the catalyst bed is re-established by decreasing the upflow liquid velocity through the catalyst bed to that maintained in normal operation, and adding a sufficient quantity of fresh catalyst to the reactor through conduit 12 to replace that withdrawn. Upon lowering the level of the catalyst bed, valve 32 in conduit 33 is closed and valve 30 is open, thereby resuming the flow of effluent through conduits 26 and 29 for combination with liquid product in conduit 2. Following each catalyst withdrawal, pot 34 may be vented, such as by valved conduit 37 leading to the plant flare, and deactivated catalyst discharged therefrom and passed to disposal or regeneration through valved conduit 38.

It can be seen that one major advantage of the present invention is that continuous flow is maintained through the catalyst withdrawal conduit 26, thus maintaining the conduit free from plugging and precluding the need for gas purging.

Although separate effluent withdrawal conduits 18 and 26 are shown in the drawing, the invention may also be practiced using a single conduit for both liquid product withdrawal and catalyst withdrawal. Thus, by modifying the apparatus of FIGURE 1 to achieve gas-liquid separation in the upper part of reactor 11, conduit 26 may serve to withdraw liquid reactor effluent during normal operation of the hydrogenation process and to remove catalyst in admixture with liquid during periods of catalyst withdrawal. Furthermore, conduit 26 may be directed downwardly instead of in an upwardly direction as is shown in the drawing.

The opening 26a may be of any suitable size or shape which will allow catalyst particles to pass therethrough. For example, the diameter of opening 26a may range from at least slightly greater than the minimum dimension of the catalyst particles, e.g. 1.1 times the minimum particle dimension, up to 40 or more times the minimum dimension of the particles.

FIGURE 2 shows another suitable apparatus arrangement for carrying out the catalyst withdrawal procedure of the present invention. Portions of the apparatus shown in FIGURE 2 which correspond to portions similar in purpose or function of the apparatus of FIGURE 1 are designated by numerals which are the same as those applied to the corresponding portions of the apparatus of FIGURE 1, but are prefixed by the numeral 1.

Referring now to FIGURE 2, a hydrogenation reactor 111 is charged with particulate catalyst through conduit 112 to form a bed 113 supported on bubble cap tray 114. A mixture of hydrogen and liquid hydrocarbon oil feed is passed through conduit 115, and combined with recycle oil in conduit 116. The resultant mixture is charged to the reactor 111 and passes upwardly through bubble cap tray 114 and catalyst bed 113 at an upflow velocity such that the catalyst particles are maintained in a state of ebullation, the gross mass thereof expanding to a well-defined upper level as denoted by 117. Radionic level indicators 117a and 117b are provided for detecting catalyst bed level 117.

The reactor 111 is provided with a downwardly extending conduit 118 having an enlarged, outwardly-flared upper portion 118a which serves to disengage gas from liquid. A liquid-gas interface is established and maintained at 124a by means of liquid level controller 124. Gaseous material, including unreacted hydrogen, may be withdrawn from the upper portion of reactor 111 through conduit 120 and, if desired, may be reused in the process. Liquid, substantially free of catalyst and gas, is continuously withdrawn from the reactor through conduit 118. A portion of the liquid withdrawn in this manner is passed through conduit 122 provided with a valve 123, the operation of which is controlled by liquid level controller 124, and recovered as product. Another portion of the liquid effluent withdrawn through conduit 118 is returned to the reactor 111 through conduit 116 by means of pump 125. As hereinbefore noted, it is generally desirable to employ recycle rates between about 5 and about 25 volumes of recycle liquid per volume of fresh feed.

Extending downwardly and in open communication with the outwardly-flared upper portion 118a of liquid withdrawal conduit 118 is a separate liquid withdrawal conduit 126. As shown in the drawing, the diameter of conduit 126 is appreciably less than that of conduit 118, thus resulting in a smaller flow through conduit 126. As previously noted, the flow through conduit 126 is preferably only about 0.01 to about 0.25 that through conduit 126 is slightly enlarged with respect to the remainder of the conduit and is provided with a plurality of slots 126a, 126b and 126c, respectively. As will be described below, the slots serve as catalyst intake ports during catalyst withdrawal, and may, therefore, be of any suitable size or shape which will permit passage of the catalyst particles therethrough.

According to one embodiment, the upper level 117 of the catalyst bed during normal operation is maintained below the catalyst intake ports 126a, b, c, thus enabling the withdrawal of a liquid stream, substantially free of catalyst, through conduit 126. Control of the pressure and flow of the liquid stream thus withdrawn is accomplished by suitable adjustment of valves 127 and 128, respectively. The liquid effluent stream may be passed by conduit 129, provided with valve 130, for combination with the liquid product stream in conduit 122.

Catalyst withdrawal may be accomplished by increasing the rate at which liquid is recycled to the reactor through conduit 116 by suitable adjustment of pump 125, thereby increasing the level of the catalyst bed such as to 131. It will be noted that the elevated bed level 131 is positioned above the catalyst intake ports 126a, 126b, and 126c, but below the top opening of the gas-disengaging zone 118a, thereby enabling the continuous withdrawal of liquid, substantially free from catalyst, through conduit 118 even during the catalyst withdrawal operation.

With the catalyst bed level at 131, particulate catalyst is drawn through intake ports 126a, b, and c, and becomes entrained in liquid flowing through conduit 126. By closing valve 130 and opening valve 132, the flow of liquid catalyst slurry is directed through conduit 133 to catalyst withdrawal pot 134. Liquid is flashed from pot 134 through conduit 135 and preferably passed to a recovery operation. Catalyst withdrawal is continued until the accumulation thereof in pot 134 reaches a preestablished level 136, which is detected by level indicator 136a.

When the desired amount of catalyst has been withdrawn from the reactor, withdrawal pot 134 is vented of residual liquid by means of valved conduit 137 leading to the plant flare. Catalyst is discharged from the bottom of pot 134 through valve line 138 and is disposed of or regenerated. The normal catalyst bed level 117 is reestablished by resuming normal recycle rates through conduit 116 and adding an amount of active catalyst through line 112 equal to the amount withdrawn. Combination of the liquid effluent withdrawn through conduit 126 with liquid product in 122 may be resumed by closing valve 132 and opening valve 130.

It will be noted that the apparatus arrangement shown in FIGURE 2 enables flexible control over the catalyst withdrawal rate by adjusting the level to which the catalyst bed is elevated with respect to the catalyst intake ports 126a, b, and c. Thus, lower concentrations of catalyst in the withdrawal stream may be obtained by raising the catalyst bed level only as high as intake ports 126a or 126b. More or fewer intake ports may, of course, be provided.

In accordance with another suitable procedure for practicing the present invention, the upflow liquid velocity through the catalyst bed is normally such as to establish a normal upper bed level 117' detected by level indicators 117'a and 117'b. As shown in the drawing, level 117' is equivalent in height to catalyst intake port 126a in withdrawal conduit 126. Thus, during normal operation, a liquid effluent stream having a relatively small catalyst concentration is withdrawn through conduit 126. Since its catalyst concentration is normally small, e.g. from about .001 to about 2 pounds per cubic foot, the liquid effluent stream may be combined with the product stream in conduit 122, or alternatively, may be passed to withdrawal pot 134 to recover the catalyst therefrom.

When withdrawal of larger amounts of catalyst is desired, the upflow liquid velocity through the catalyst bed may be suitably increased to elevate the catalyst bed level, such as to 131, and thereby increase the catalyst concentration in the liquid effluent stream in conduit 126. After a desired amount of inactive catalyst is withdrawn at the increased concentration in the liquid effluent, normal upflow liquid velocity through the bed is resumed and the upper level of the catalyst bed is re-established at 117' by the addition of fresh catalyst to replace the quantity withdrawn.

In accordance with an alternate procedure to that just-noted, the catalyst concentration in the liquid effluent stream in conduit 126 may be intermittently increased by maintaining the upflow liquid velocity through the catalyst bed constant, while incrementally adding active catalyst to the bed through line 112 to elevate the catalyst bed level to 131.

As previously noted the catalyst intake ports represented at 126a, b and c may be of any suitable size and shape which will permit catalyst particles to pass therethrough. Thus, the ports may be circular, rectangular or the like. Furthermore, a vertically disposed screen having a suitable mesh size may be employed in lieu of the intake ports. Preferably, however, each catalyst intake port has a horizontal dimension at least slightly greater than the minimum dimension of the catalyst particles. For example, when the catalyst particles are in the form of elongated extrudates, the horizontal dimension of each catalyst intake port may range from about 1.1 to about 40 or more times the diameter of the particles. Particularly desirable results are obtained when the horizontal dimension of the intake port is not greater than about 10 times, such as from 2 to 4 times, the minimum dimension of the catalyst particles. The total of the cross-sectional areas of the intake ports is also an important consideration. Accordingly, when catalyst is withdrawn downwardly, as in the apparatus arrangement illustrated in FIGURE 2, the total cross-sectional area of all of ports 126a, b and c may, with advantage, range from about 0.1 to about 1.5 times that of the withdrawal conduit 126, but is preferably from about 0.9 to about 1.1 that of the withdrawal conduit. When catalyst withdrawal conduit 126 is directed upwardly through the top of reactor 111, instead of downwardly, the total of the cross-sectional areas of the intake ports may advantageously range from about 0.1 to about 0.7 times the cross-sectional area of conduit 126. Furthermore, it is preferred that upon expanding the normal volume of the ebullated bed by from about 5 to about 20%, the upper level of the catalyst bed is raised above at least one catalyst intake port which is above the upper level of the catalyst bed during normal operation.

In practicing the present invention as described herein in connection with a hydrogenation process, the catalyst concentration in the effluent stream withdrawn during normal operation through conduit 26 of the apparatus of FIGURE 1 or conduit 126 of the apparatus of FIGURE 2 may typically range from substantially nil (e.g., less than about .001 pounds per cubic foot) to about 2 pounds per cubic foot. During periods when it is desired to withdraw large amounts of catalyst from the reactor, the increased catalyst concentration in the effluent stream may, for example, be from about 3 pounds to about 45 pounds per cubic foot.

The invention will now be further described in reference to the following specific and non-limitative examples:

EXAMPLE 1

Using an apparatus arrangement as shown in FIGURE 1, a heavy residual crude oil fraction is introduced into reactor 11, maintained at a temperature of 825° F. and a pressure of 2500 p.s.i.g., together with 7200 standard cubic feet of hydrogen per barrel of feed. The catalyst inventory in the reactor is 48,000 pounds of 0.025 to 0.035 inch diameter cobalt-molybdate extrudates, 60 weight percent of which have a length of from 0.1 to 0.25 inch, less than 10% of which have a length greater than 0.25 inch, and less than 30 weight percent of which have a length of from 0.01 to 0.1 inch. The catalyst is maintained in an ebullated state by passing the oil-gas mixture through the catalyst bed at an upflow liquid velocity of 49.3 gallons per minute per square foot of horizontal cross-section of the ebullated mass during normal operation. A liquid-gas mixture is removed from the reactor through conduit 18 and is passed to a gas-liquid separator 19. The liquid stream is recovered from the gas-liquid separator through conduit 21 at a rate of 103,000 barrels per day. A second liquid-gas mixture containing substantially no catalyst is removed from the reactor through conduit 26, which extends upwardly from open end 26a located about 1 foot above the normal upper level of the ebullated bed and has an 0.5 inch I.D. This second effluent stream, which amounts to about 80 barrels per day of liquid, is combined with hydrogenated product in conduit 22.

It is desired to replace 1105 pounds of deactivated catalyst with fresh catalyst once a day. This is accomplished by directing the flow of the effluent withdrawn from the reactor through conduit 26 to catalyst withdrawal pot 34, and increasing the upflow liquid velocity through the catalyst bed to a value of 58 gal./min./ft.², thereby raising the upper level of the catalyst bed about 6 inches above open end 26a of conduit 26. The concentration of catalyst in the fluid effluent withdrawn through conduit 26 is about 30 pounds per cubic foot.

After the catalyst withdrawal period, which lasts two (2) hours, the normal upflow liquid velocity is resumed and catalyst is added to the reactor in an amount equivalent to the amount withdrawn. Clogging of conduit 26 due to coke formation is not experienced.

EXAMPLE 2

A hydrogenation process is carried out at essentially the same conditions as in Example 1, except as hereinafter noted, using the apparatus arrangement shown in FIGURE 2. A 1-inch I.D. withdrawal conduit 126 is provided with seven (7) square slots (¼″ x ¼″) spaced 6″ apart. During normal operation of the hydrogenation process, the upper level of the catalyst bed is maintained approximately at the lowermost of the slots. The concentration of catalyst in the liquid effluent stream withdrawn from the reactor from conduit 126 is about 0.1 pound per cubic foot.

At 24-hour intervals, 1200 pounds of fresh catalyst is added to the reactor, thereby raising the upper level of the catalyst bed 9.6 inches and increasing the concentration of catalyst in the effluent stream to five (5) pounds per cubic foot. About 210 minutes are required to remove 1200 pounds of catalyst.

No clogging or serious corrosion of conduit 126 is experienced after repeated practice of the catalyst withdrawal procedure.

While the invention has been described above in connection with certain preferred embodiments thereof, it will be understood by those skilled in the art that various changes and modifications may be made without departing from the spirit and scope of the invention as expressed in the appended claims.

Therefore, we claim:

1. In the contacting of a fluid with a particulate catalyst wherein said catalyst is maintained within a bed within a fluid-catalyst contacting zone and said fluid is passed upwardly through and in contact with said catalyst bed at an upflow velocity such as to establish an ebullated catalyst bed having a normal, substantially definite upper level, the catalyst becoming at least partially deactivated as a result of said contacting, the method of withdrawing particulate catalyst from said contacting zone which comprises withdrawing a fluid effluent stream having a normal catalyst concentration through a passage having an intake port located above said normal upper catalyst bed level, intermittently elevating the upper level of said catalyst bed above said normal upper level and above said catalyst intake port, to thereby increase the catalyst concentration of said effluent stream, re-establishing said normal upper level of the catalyst bed after a desired amount of catalyst is withdrawn at said increased concentration in the effluent stream and resuming withdrawal of said effluent stream of normal catalyst concentration.

2. Method as in claim 1 wherein said effluent stream is withdrawn through a passage extending generally vertically through the fluid-catalyst contacting zone and provided with at least one catalyst intake port located above said normal upper caalyst bed level, and the upper level of the catalyst bed is intermittently elevated above said catalyst intake port, whereby the concentration of catalyst in the effluent stream is increased.

3. Method as in claim 2 wherein the upper level of the catalyst bed is raised above said catalyst intake port by expanding the normal volume of the catalyst bed by from about 5 to about 20 percent.

4. Method as in claim 2 wherein said catalyst intake port is formed by the end of said withdrawal passage opening into said reactor, said end being above the normal upper level of the catalyst bed.

5. Method as in claim 2 wherein said withdrawal passage is provided with a plurality of vertically disposed catalyst intake ports, at least one of said catalyst intake ports being above the normal upper level of the catalyst bed.

6. Method as in claim 2 wherein said normal upper level of the catalyst bed is intermittently elevated above said catalyst intake port by increasing the upflow velocity of fluid through said catalyst bed, and said normal upper level of the catalyst bed is re-established after a desired amount of deactivated catalyst has been withdrawn by resuming the normal upflow velocity of fluid through the catalyst bed and adding active particulate catalyst to the bed in an amount equivalent to that withdrawn therefrom.

7. Method as in claim 5 wherein said normal upper level of the catalyst bed is established at one of said vertically disposed catalyst intake ports, and said upper level of the catalyst bed is intermittently elevated by increasing the upflow fluid velocity through the catalyst bed, and said normal upper level of the catalyst bed is re-established after a desired amount of deactivated catalyst has been withdrawn by resuming the normal upflow velocity of fluid through the catalyst bed and adding active particulate catalyst to the bed in an amount equivalent to that withdrawn therefrom.

8. Method as in claim 5 wherein said normal upper level of the catalyst bed is established at one of said vertically disposed catalyst intake ports, and said upper level of the catalyst bed is intermittently elevated by adding active particulate catalyst to said bed in an amount equivalent to the amount of deactivated catalyst it is desired to withdraw.

9. Method as in claim 4 wherein said open end of said catalyst withdrawal passage has a diameter of at least 1.1 times greater than the minimum dimension of the catalyst particles.

10. Method as in claim 5 wherein said withdrawal passage is extended generally vertically upwardly and each of said catalyst intake ports has a horizontal dimension of from about 1.1 to about 40 times greater than the minimum dimension of the catalyst particles, and the total cross-sectional area of the catalyst intake ports is from about 0.1 to about 0.7 times the cross-sectional area of the withdrawal passage.

11. Method as in claim 5 wherein said withdrawal passage is extended generally vertically downwardly and each of said catalyst intake ports has a horizontal dimension of from about 1.1 to about 40 times greater than the minimum dimension of the catalyst particles, and the total cross-sectional area of the catalyst intake ports is from about 0.1 to about 1.5 times the cross-sectional area of the withdrawal passage.

12. Method as in claim 1 wherein said fluid is a mixture of hydrocarbon oil and hydrogen and said fluid-catalyst contacting zone is a hydrogenation zone.

13. Method as in claim 12 wherein the normal catalyst concentration in said effluent stream is from substantially nil to about 2 pounds per cubic foot, and the catalyst concentration thereof is increased to about 3 to about 45 pounds per cubic foot upon elevating said upper catalyst bed level.

14. Method as in claim 13 wherein said normal catalyst concentration is substantially nil.

15. In a process for hydrogenating a liquid hydrocarbon oil by flowing said oil upwardly with added hydrogen through and in contact with a bed of particulate catalyst at an upflow velocity such as to establish an ebullated catalyst bed having a normal, substantially definite upper level, with the catalyst becoming at least partially deactivated as a result of said contacting, and a liquid effluent stream, substantially free of catalyst, is withdrawn continuously from a locus in said hydrogenation zone above the normal upper level of the catalyst bed, a portion of said liquid effluent being recycled to said hydrogenation zone and another portion of said effluent being recovered as product, the method of withdrawing particulate catalyst from said hydrogenation zone which comprises withdrawing a second liquid effluent stream having a normal catalyst concentration, the flow of said second effluent stream being from about 0.01 to about 0.25 times that of said first-mentioned liquid effluent stream, and combining said second effluent stream with said liquid product, intermittently elevating the upper level of said catalyst bed above said normal upper level, but below said locus at which said first-mentioned liquid effluent stream is withdrawn, and thereby increasing the concentration of catalyst in said second effluent stream, passing said second liquid effluent stream containing said increased catalyst concentration to a catalyst recovery zone, reestablishing said normal upper level of the catalyst bed after a desired amount of catalyst has been recovered, and resuming withdrawal of said second liquid effluent stream of normal catalyst concentration.

References Cited
UNITED STATES PATENTS

| | | | |
|---|---|---|---|
| 2,779,719 | 1/1957 | Spitz et al. | 208—152 |
| 3,144,303 | 8/1964 | Engelmann | 208—146 |
| 3,336,217 | 8/1967 | Meaux | 208—143 |

DELBERT E. GANTZ, *Primary Examiner.*

HERBERT LEVINE, *Assistant Examiner.*